Figure 1:
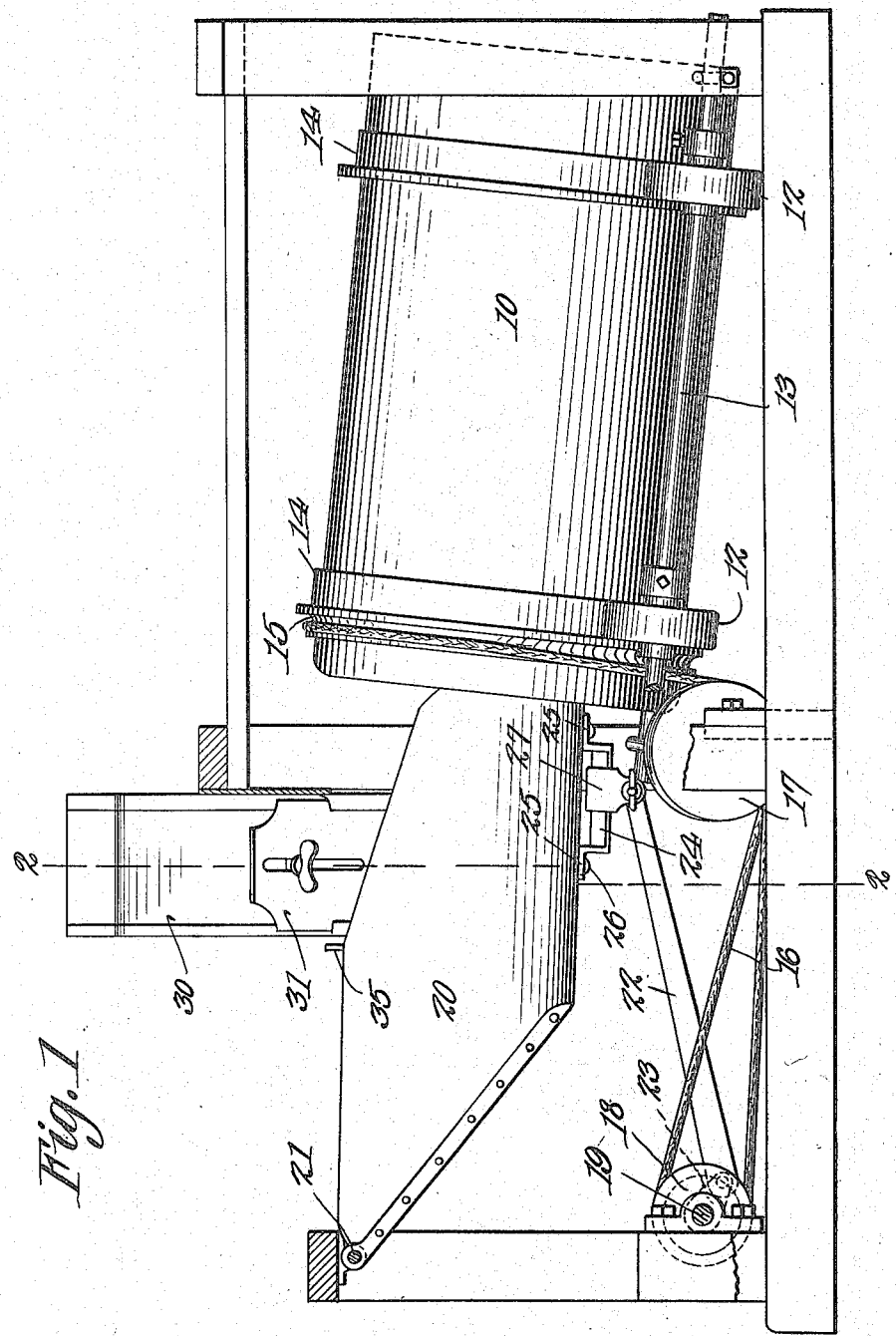

L. C. HAMEL.
FEEDER FOR MIXING APPARATUS.
APPLICATION FILED APR. 17, 1914.

1,129,866.

Patented Mar. 2, 1915.
2 SHEETS—SHEET 1.

Witnesses
H. B. Wooten.
M. C. Lucas.

LOUIS C. HAMEL   Inventor

By Max A. Schmidt
Attorneys

L. C. HAMEL.
FEEDER FOR MIXING APPARATUS.
APPLICATION FILED APR. 17, 1914.
1,129,866.
Patented Mar. 2, 1915.
2 SHEETS—SHEET 2.
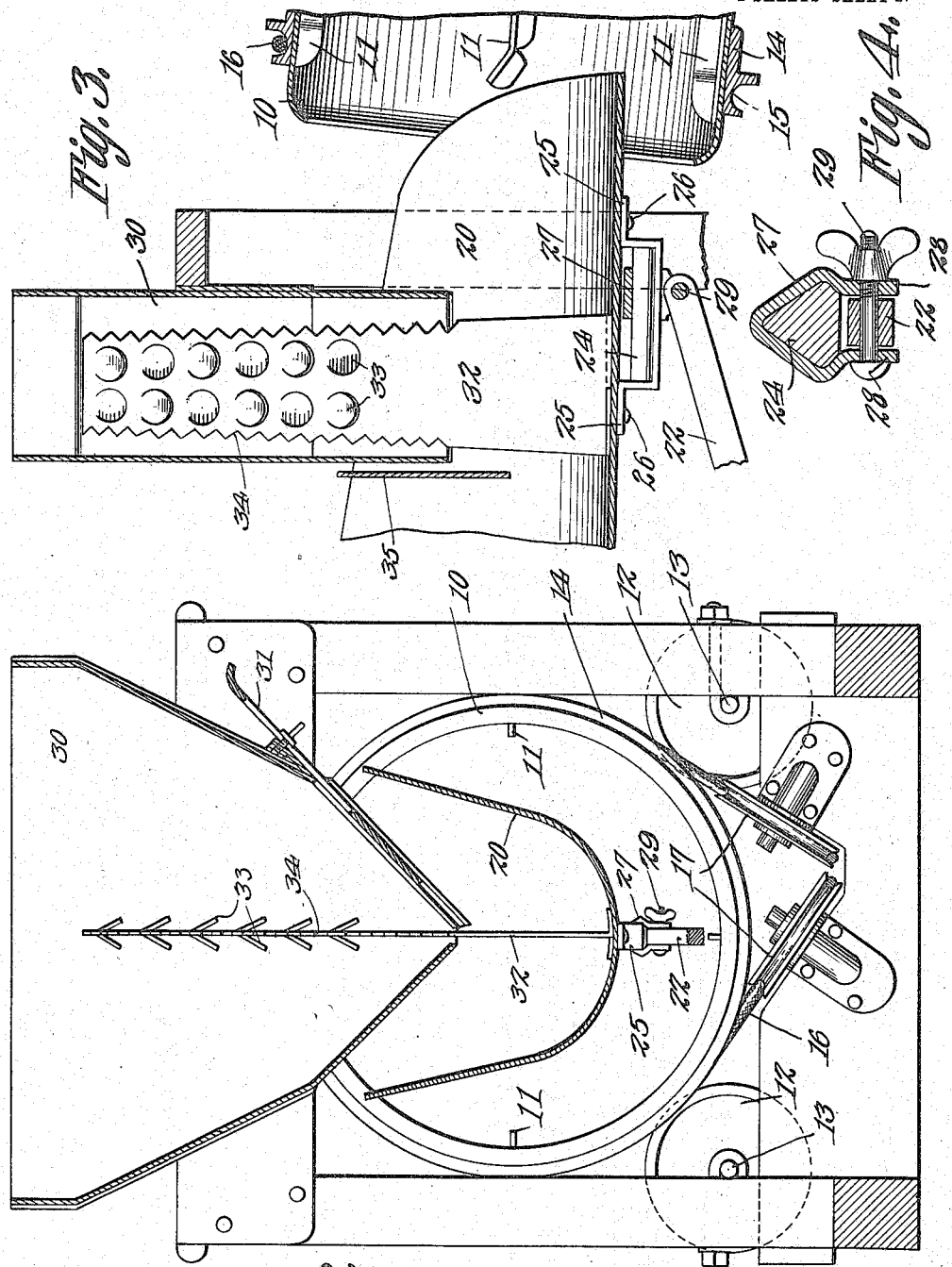
Witnesses
F. B. Wooders.
M. C. Lucas
LOUIS C. HAMEL
Inventor
By Max A. Schmidt
Attorneys

UNITED STATES PATENT OFFICE.

LOUIS C. HAMEL, OF APPLETON, WISCONSIN.

FEEDER FOR MIXING APPARATUS.

1,129,866.          Specification of Letters Patent.     Patented Mar. 2, 1915.

Application filed April 17, 1914. Serial No. 832,557.

*To all whom it may concern:*

Be it known that I, LOUIS C. HAMEL, a citizen of the United States, residing at Appleton, in the county of Outagamie and State of Wisconsin, have invented certain new and useful Improvements in Feeders for Mixing Apparatus, of which the following is a specification.

This invention relates to mixers for concrete and analogous material, and more particularly to the apparatus for feeding the cement, stone, sand and other material into the mixing drum.

It is the object of the present invention to provide a novel and improved feed apparatus having a shaking feed, and constructed so that the feed may be readily regulated.

This object is attained by means of a combination and arrangement of parts to be hereinafter described and claimed, reference being had to the accompanying drawings in which—

Figure 1 is a side elevation of the apparatus; Fig. 2 is a cross-section on the line 2—2 of Fig. 1; Fig. 3 is a longitudinal section of the forward or discharge end of the feed device, and Fig. 4 is an enlarged cross-section of a pitman connection.

Referring specifically to the drawings, 10 denotes a rotary mixing drum which is open at both ends, and inclined in the direction of its discharge end. The material to be mixed is thrown into the receiving end of the drum, and by reason of the incline of the drum the material travels toward the opposite end of the drum from which latter it is discharged. The rotary motion of the drum results in a thorough mixture of the material, and to increase the mixing action the interior of the drum is provided with longitudinal ribs 11 pointing inward. The drum 10 is supported on rollers 12 mounted on shafts 13 extending along the sides of the drum, near the bottom, and parallel to the drum axis. The outer surface of the drum is fitted with flanged rings 14 which are engaged by the rollers, the flanges of the rings preventing the drum from slipping down in the direction of its discharge end. Near the upper or receiving end of the drum is a grooved ring 15 which holds a drive belt 16. The ends of the belt are trained over guide pulleys 17 located beneath the drum, from which guide pulleys the belt passes to a pulley 18 on a drive shaft 19 driven from any suitable source of power.

The apparatus is mounted in a suitable supporting frame carrying bearings for the shafts and pulleys hereinbefore described. At the receiving end of the drum is located a shoe 20 which is pivotally hung from a rod 21 carried by the supporting frame of the apparatus. The pivot of the shoe is at the highest point thereof and the free end of the shoe, which is the lowest point, extends slightly into the receiving end of the drum to discharge thereinto. The shoe vibrates in a vertical plane, and receives motion from the shaft 19 through a pitman 22 connected at one end to the lowest portion of the shoe, and at the opposite end to a crank 23 on said shaft. The connection between the pitman and the shoe is an adjustable one in order that the discharge end of the shoe may be raised or lowered to regulate the flow of material from the shoe.

On the bottom of the shoe 20, near its discharge end, is mounted a bar 24 which extends in the direction of the length of the shoe and is pentagonal in cross-section. The bar is spaced slightly from the bottom of the shoe and has ears 25 at its ends through which pass bolts or other fasteners 26 for securing the bar to the shoe. The bar is straddled by a flexible clamping member 27 which is shaped to conform to the cross-section of the bar, and has below said bar two opposite, spaced ears 28 which are connected by a bolt 29, which latter, when it is tightened up, binds the member 27 on the bar. The end of the pitman 22 is located between the ears 28, and the bolt 29 passes therethrough, whereby the connection between the pitman and the shoe is made. This connection is an adjustable one for the purpose hereinbefore stated, adjustment being effected by loosening up the bolt 29 to release the member 27, which may then be slid along the bar 24, and upon tightening up the bolt, the member is again securely held in adjusted position. The pitman is loose between the ears 28 so that its movement is not affected when the bolt 29 is tightened up to clamp the member 27 on the bar 24. By reason of the pentagonal cross-section of the bar 24, the member 27 is caused to bind against four faces thereof, in view of which it will be securely clamped. The ears 28 project outward from the other face of the bar.

The shoe 20 vibrates in a vertical plane, the motion at the discharge end being in the arc of a circle having for its center the pivot or hinge 21 of the shoe. The motion is applied to the shoe at its discharge end, where it exerts its greatest influence, and as this end of the shoe carries the least mass of material, the same is caused to travel faster as it approaches said end. The bottom of the shoe travels forward as it rises and drops rearward as it falls, thus giving the shoe a throwing motion. The lowering of the discharge end of the shoe, by changing the pitman connection, not only increases the decline toward said end but also gives the shoe a greater throwing motion.

Above the shoe 20 is mounted, to discharge thereinto, a hopper 30 having an adjustable slide 31 on one side to regulate the area of the outlet. In this hopper, through the outlet thereof, extends an agitator comprising a bar 32 secured to and rising from the shoe so as to partake of the motion thereof. The agitator bar has outstanding and downwardly pointing fingers 33 on both sides which may be formed by punching tongues into the bar and bending the same outward as shown. The edges of the bar are also serrated, as indicated at 34. The fingers 33 and the serrations 34 are designed to crush any small lumps of cement and to reduce the same so that it will pass readily through the outlet of the hopper 30.

In the shoe 20, intermediate the ends thereof, is a partition 35 which is spaced from the bottom of the shoe. The hopper 30 and the agitator 32 are located on one side of this partition. In operation, stone and sand are thrown into the upper end of the shoe in front of the partition 35, and cement is discharged from the hopper 30 into the shoe, behind the partition. The material is carried by the vibrating motion of the shoe toward the discharge end of the shoe, which throws it into the drum 10 to be mixed therein as hereinbefore described.

The downwardly pointing fingers 33 of the agitator bar crush and break up all lumps present in the mass of material contained in the hopper 30, and also force the material down toward the outlet. The serrated or saw-tooth edges 34 reciprocate up and down in the mass of material and thereby aid to break up the lumps. The agitator has a combined striking and sawing action which has been found very efficient in insuring a continuous and steady flow of cement from the hopper.

I claim:

1. A feeder for mixing apparatus, comprising a shoe pivoted at one end to vibrate in a vertical plane and in the direction of its length, a longitudinal bar carried by the opposite end of the shoe, a clamping member adjustably mounted on said bar, a pitman connected to the clamping member, and pitman operating means.

2. A feeder for mixing apparatus, comprising a shoe pivoted at one end to vibrate in a vertical plane and in the direction of its length, a longitudinal bar carried by the opposite end of the shoe, a clamping member adjustably mounted on said bar and having spaced outstanding ears, a bolt connecting the ears for securing the clamping member on the bar, a pitman loosely located between the ears, through which pitman the bolt passes, and pitman operating means.

3. A feeder for mixing apparatus, comprising a shoe pivoted at one end to vibrate in a vertical plane and in the direction of its length, a longitudinal bar carried by the opposite end of the shoe, a flexible clamping member adjustably mounted on said bar and having spaced outstanding ears, a bolt connecting the ears for binding the clamping member on the bar, a pitman loosely located between the ears, through which pitman the bolt passes, and pitman operating means.

4. A feeder for mixing apparatus, comprising a shoe pivoted at one end to vibrate in a vertical plane and in the direction of its length, a longitudinal bar carried by the opposite end of the shoe, said bar being angular in cross-section, a flexible clamping member embracing the bar and shaped to engage all the faces of said bar except one, at which latter face the member has spaced outstanding ears, a clamping bolt passing through the ears, a pitman loosely mounted between the ears, through which pitman the bolt passes, and pitman operating means.

5. A feeder for mixing apparatus, comprising a shoe pivoted to vibrate in a vertical plane, a hopper discharging into the shoe, and an agitator extending from the shoe into the hopper, said agitator comprising a flat, solid bar having vertical sawtooth edges, said bar being spaced from the walls of the discharge opening of the hopper, and the material in the hopper being fed downward between said walls and the edges and sides of the bar.

6. A feeder for mixing apparatus, comprising a shoe pivoted to vibrate in a vertical plane, a hopper discharging into the shoe, and an agitator extending from the shoe into the hopper, said agitator comprising a flat, solid bar having vertical sawtooth edges, and crushing fingers projecting from opposite sides, said bar being spaced from the walls of the discharge opening of the hopper, and the material in the hopper being fed downward between said hopper walls and the edges and sides of the bar.

In testimony whereof I affix my signature in presence of two witnesses.

LOUIS C. HAMEL.

Witnesses:
M. A. SCHUH,
JACOB KREHN.